(12) United States Patent
Hanslik et al.

(10) Patent No.: US 11,535,213 B2
(45) Date of Patent: Dec. 27, 2022

(54) METHOD FOR LEARNING BRAKING STEP THRESHOLD VALUES OF A SUSTAINED-ACTION BRAKE OPERATED IN BRAKING STEPS, AND BRAKING SYSTEM

(71) Applicant: WABCO GmbH, Hannover (DE)

(72) Inventors: Daniel Hanslik, Isernhagen (DE); Stephan Kallenbach, Hannover (DE); Ahmed Ragab, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 385 days.

(21) Appl. No.: 16/614,805

(22) PCT Filed: Apr. 26, 2018

(86) PCT No.: PCT/EP2018/060738
§ 371 (c)(1),
(2) Date: Nov. 19, 2019

(87) PCT Pub. No.: WO2019/001799
PCT Pub. Date: Jan. 3, 2019

(65) Prior Publication Data
US 2020/0172062 A1 Jun. 4, 2020

(30) Foreign Application Priority Data
Jun. 26, 2017 (DE) .................. 10 2017 006 031.2

(51) Int. Cl.
*B60T 8/172* (2006.01)
*F02D 9/06* (2006.01)
(Continued)

(52) U.S. Cl.
CPC .............. *B60T 8/172* (2013.01); *B60T 10/02* (2013.01); *B60T 13/662* (2013.01); *F02D 9/06* (2013.01);
(Continued)

(58) Field of Classification Search
CPC ........ B60T 8/172; B60T 10/02; B60T 13/662; B60T 1/087; B60T 1/093; B60T 7/12;
(Continued)

(56) References Cited

U.S. PATENT DOCUMENTS

2008/0071453 A1 3/2008 Nakanishi et al.
2008/0159880 A1 7/2008 Laukemann et al.
(Continued)

FOREIGN PATENT DOCUMENTS

DE 4446085 A1 7/1995
DE 69809386 T2 8/2003
(Continued)

*Primary Examiner* — Brian P Sweeney
(74) *Attorney, Agent, or Firm* — Leydig, Voit & Mayer, Ltd.

(57) ABSTRACT

A method for learning braking step threshold values of a sustained-action brake includes detecting a braking requirement setpoint, controlling the sustained-action brake with the braking requirement setpoint to generate a braking effect variable of the sustained-action brake, and detecting a sustained-action brake actual braking effect variable and a maximum sustained-action brake braking effect. The method additionally includes forming a braking effect variable coefficient that characterizes a ratio of the sustained-action brake actual braking effect variable and the maximum sustained-action brake braking effect variable that results from control of the sustained-action brake with the braking requirement setpoint, and assigning the braking effect variable coefficient to a braking step of the sustained-action brake such that each braking step is assigned only one braking effect variable. Additionally, the method includes storing the braking requirement setpoint that results in the braking effect variable coefficient.

17 Claims, 3 Drawing Sheets

(51) Int. Cl.
*B60T 10/02* (2006.01)
*B60T 13/66* (2006.01)
B60T 1/087 (2006.01)
B60W 30/18 (2012.01)

(52) U.S. Cl.
CPC ........ *B60T 1/087* (2013.01); *B60W 30/18136* (2013.01); *B60W 2540/12* (2013.01); *B60W 2710/0666* (2013.01)

(58) Field of Classification Search
CPC .... B60T 10/04; F02D 9/06; B60W 30/18136; B60W 2540/12; B60W 2710/0666
See application file for complete search history.

(56) References Cited

U.S. PATENT DOCUMENTS

| | | |
|---|---|---|
| 2009/0012680 A1 | 1/2009 | Kley et al. |
| 2009/0112391 A1 | 4/2009 | Uematsu |
| 2017/0096947 A1 | 4/2017 | Palm |

FOREIGN PATENT DOCUMENTS

| | | | |
|---|---|---|---|
| DE | 102004048120 A1 | 4/2006 | |
| DE | 102004048121 A1 | 4/2006 | |
| DE | 102009016816 A1 | 10/2010 | |
| DE | 102011101773 A1 * | 11/2012 | ............. B60T 8/267 |
| DE | 102012020937 B3 | 11/2013 | |
| DE | 102015012735 A1 | 4/2017 | |
| EP | 0937619 A1 | 8/1999 | |
| EP | 1431149 A1 | 6/2004 | |
| EP | 2123500 A1 * | 11/2009 | ............. B60T 10/00 |
| WO | WO 2006119849 A1 | 11/2006 | |

* cited by examiner

METHOD FOR LEARNING BRAKING STEP THRESHOLD VALUES OF A SUSTAINED-ACTION BRAKE OPERATED IN BRAKING STEPS, AND BRAKING SYSTEM

CROSS REFERENCE TO RELATED APPLICATIONS

This application is a U.S. National Phase application under 35 U.S.C. § 371 of International Application No. PCT/EP2018/060738, filed on Apr. 26, 2018, and claims benefit to German Patent Application No. DE 10 2017 006 031.2, filed on Jun. 26, 2017. The International Application was published in German on Jan. 3, 2018 as WO 2019/001799 A1 under PCT Article 21(2).

FIELD

The invention relates to a method for learning braking step threshold values of a sustained-action brake operated in braking steps in a commercial vehicle, in particular in a truck or in an omnibus, as well as a braking system in which such method can be carried out.

BACKGROUND

Electronic braking systems (EBS) in commercial vehicles may have different types of brakes. This means that service brakes, for example friction brakes, may be provided and, in addition, sustained-action brakes or retarders, with which the commercial vehicle, in the case of a primary sustained-action brake, can be braked by the driven wheels of the commercial vehicle by implementing engine braking with a sustained-action brake actual braking torque generated as a result. Engine exhaust brakes or exhaust flap brakes (exhaust retarder, XR) are known as such primary sustained-action brakes, which by at least partial targeted closure of the exhaust pipe cause a reduction of an engine revolution rate by means of a butterfly valve and thus engine braking. Furthermore, decompression brakes (ER) are also known as primary sustained-action brakes, which can achieve a reduction in engine revolution rate at the appropriate moment by selectively supplying air to the cylinders in the engine, so that engine braking can also be implemented by this means.

Such primary sustained-action brakes allow wear-free build-up of a sustained-action brake braking torque in the vehicle, so that these can be used in a braking system to minimize the wear on the service brakes in the presence of a braking requirement by controlling the sustained-action brake in the appropriate situations instead of or in addition to the control of the service brakes in order to implement the braking requirement. The sustained-action brake can be controlled manually by the driver via a lever or a pedal and/or automatically by an assistance control system, which is embodied to decelerate the commercial vehicle automatically according to predetermined parameters, for example in the context of adaptive speed control (ACC), electronic stability program (ESP) or cruise control (CC).

SUMMARY

In an embodiment, the present invention provides a method for learning braking step threshold values of a sustained-action brake, configured to be operated in braking steps, of a commercial vehicle. The method includes detecting a braking requirement setpoint and controlling the sustained-action brake with the braking requirement setpoint to increase or reduce an actual deceleration of the commercial vehicle to generate a braking effect variable of the sustained-action brake. The method further includes detecting a sustained-action brake actual braking effect variable and a maximum sustained-action brake braking effect. The sustained-action brake actual braking effect variable characterizes the braking effect variable generated by the sustained-action brake as result of control with the braking requirement setpoint. The maximum sustained-action brake braking effect variable characterizes a maximum braking effect variable that can be produced by the sustained-action brake during control of the sustained-action brake with the braking requirement setpoint. The method additionally includes forming a braking effect variable coefficient that characterizes a ratio of the sustained-action brake actual braking effect variable and the maximum sustained-action brake braking effect variable that results from control of the sustained-action brake with the braking requirement setpoint. Furthermore, the method includes assigning the braking effect variable coefficient to a braking step of the sustained-action brake such that each braking step is assigned only one braking effect variable. Finally, the method includes storing the braking requirement setpoint that results in the braking effect variable coefficient, as the braking step threshold value of the braking step to which the braking effect variable coefficient is assigned. The braking step threshold value indicates the braking requirement setpoint at which the respective braking step is activated or deactivated.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
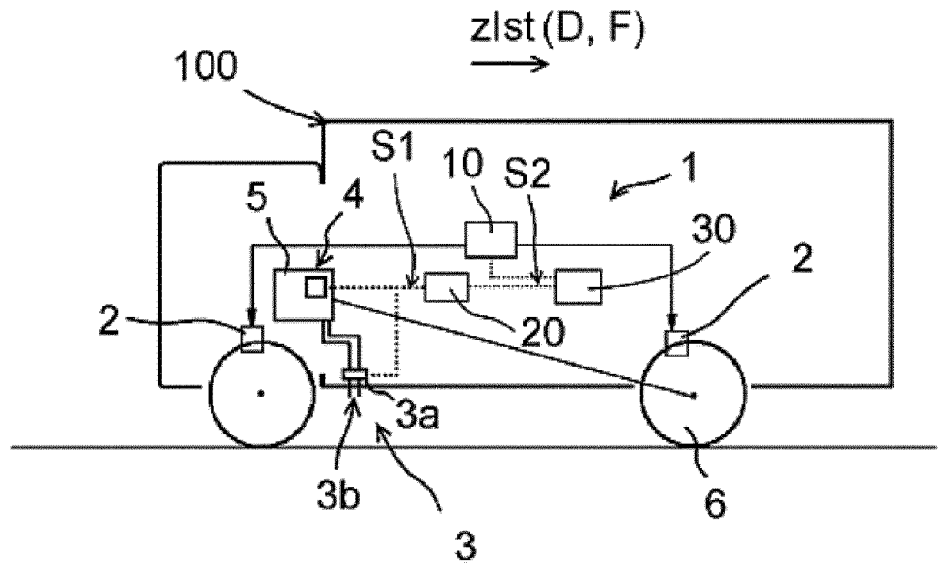
FIG. 1 shows a schematic view of a commercial vehicle with a braking system with a sustained-action brake.

The disadvantage of the automated control is that such sustained-action brakes are sometimes operated in braking steps, i.e. the sustained-action brake can only generate discrete values for the sustained-action brake actual braking torque. Depending on the design of the sustained-action brake, said discrete values will be distributed as desired between a minimum sustained-action brake braking torque corresponding to a passive operating mode of the sustained-action brake and a maximum sustained-action brake braking torque, which characterizes a maximum possible braking effect of the sustained-action brake at the time of the control of the sustained-action brake.

If such a sustained-action brake operated in braking steps is continuously controlled by one of the assistance control systems by continuously specifying a braking requirement in the form of a specific braking requirement setpoint, for example a sustained-action brake setpoint braking torque, to the sustained-action brake, it may occur without the knowledge of braking step threshold values that indicate when the respective braking step is activated or deactivated, that the braking requirement is not optimally implemented by the sustained-action brake. This can occur, for example, if the automatically specified braking requirement setpoint does not exceed a certain braking step threshold value assigned to an optimal braking step for implementation of the braking requirement, and the respective braking step is not activated as a result. Thus, for example, a sustained-action brake actual braking torque that is too low is generated. In this case, brakes that are susceptible to wear, for example service brakes or secondary sustained-action brakes, are used as a supplement in order to still meet the braking performance on the vehicle in line with the braking requirement. However, this does not ensure wear-optimized braking of the braking system.

The invention specifies methods for learning braking step threshold values of a sustained-action brake that is operated in braking steps, so that reliable and low-wear braking of a commercial vehicle by the sustained-action brake can be ensured. Furthermore, the invention provides braking systems for carrying out such methods.

According to the invention, it is therefore provided in a learning process to detect a sustained-action brake actual braking effect variable, which is generated by a sustained-action brake as a result of controlling the sustained-action brake with a braking requirement setpoint, and to detect a maximum sustained-action brake braking effect and to form a braking effect coefficient therefrom that characterizes a ratio of the sustained-action brake actual braking effect variable and the maximum sustained-action brake braking effect variable. This braking effect variable coefficient can then be assigned to a braking step of the sustained-action brake, wherein the assignment is carried out in such a way that each braking step is assigned only one braking effect variable coefficient.

As a result, the number of braking steps that are available when the sustained-action brake is applied can advantageously be determined in the learning process. If the braking effect variable coefficient changes, the sustained-action brake switches to a different braking step, since the sustained-action brake then produces a sustained-action brake braking effect variable that is changed compared to the maximum sustained-action brake braking effect variable. Since it is assumed that in each braking step the sustained-action brake produces a different discrete sustained-action brake actual braking effect variable, which is always in the same proportion to the maximum sustained-action brake braking effect variable in the respective braking step, a number of braking steps can be easily identified from a variation of the braking effect variable coefficient if the braking requirement setpoint in one or more learning processes varies appropriately across the entire spectrum of the braking requirement.

Preferably, activating a braking step in which a higher sustained-action brake actual braking effect variable is generated can be concluded from an increase in the braking effect variable coefficient as a result of control of the sustained-action brake with the braking requirement setpoint and deactivating the braking step and activating a braking step in which a lower sustained-action brake actual braking effect variable is generated can be concluded from a decrease in the braking effect variable coefficient as a result of activating the sustained-action brake with the braking requirement setpoint. The braking steps may be provided with an index depending on this according to the braking effect variable coefficient, wherein a lower index can be assigned to a braking step with a lower sustained-action brake actual braking effect variable, so that the braking steps can be ordered according to the generated sustained-action brake actual braking effect variable. As a result, subsequent control can be simplified.

The braking requirement setpoint may preferably be in the form of a setpoint vehicle deceleration, a sustained-action brake setpoint braking torque or a sustained-action brake setpoint braking force. The braking requirement setpoint characterizes the extent to which the commercial vehicle is to be braked, i.e. whether an increase or reduction of an actual vehicle deceleration of the commercial vehicle is to be carried out, wherein this is carried out by adjusting a braking effect variable of the sustained-action brake.

The braking effect variables of the sustained-action brake are preferably a sustained-action brake braking torque or a sustained-action brake braking force, which are generated by the sustained-action brake and which ensure a corresponding deceleration effect of the commercial vehicle. This is carried out by reducing an engine revolution rate of an engine of the commercial vehicle by means of the respective sustained-action brake, which may be embodied, for example, as an engine exhaust brake and/or as a decompression brake, whereupon engine braking is triggered. The engine braking causes a deceleration via driven wheels of the commercial vehicle depending on the generated braking effect variable.

The value of the braking effect variable generated as a result of the control of the sustained-action brake with the braking requirement setpoint will be indicated by the sustained-action actual brake braking effect, which may therefore be a sustained-action brake actual braking torque or a sustained-action brake actual braking force. Furthermore, the maximum sustained-action brake braking effect variable—i.e. the maximum sustained-action brake braking torque or the maximum sustained-action brake braking force—indicates the maximum braking effect variable of the sustained-action brake that can be generated during control of the sustained-action brake with the braking requirement setpoint.

This maximum sustained-action brake braking effect variable is particularly dependent on the engine revolution rate of the engine. As a result, the engine braking triggered by the sustained-action brake also changes the engine revolution rate and therefore also the maximum sustained-action brake braking effect. Since the sustained-action brake actual braking effect variables produced discretely in the respective braking steps are normally dependent on the maximum sustained-action brake braking effect variable, the sustained-action brake actual braking effect variables of the respective braking step also change in the event of a change in the engine revolution rate. However, this does not affect the braking effect variable coefficient, as the ratio between the sustained-action brake actual braking effect variable generated in a braking step and the maximum sustained-action brake braking effect variable always remains the same.

According to the invention, moreover, the braking requirement setpoint resulting in the braking effect variable coefficient is also stored as the braking step threshold value of the braking step to which the braking effect variable coefficient is assigned. The braking step threshold value indicates the braking requirement setpoint at which the respective braking step is activated and/or deactivated.

In this way, it can advantageously be achieved that after an assignment to a braking step has taken place, the braking requirement setpoint that has led to the activation of said braking step can already be taken into account as a threshold value for said braking step in a subsequent control of the sustained-action brake when implementing automatically requested braking. The braking requirement at which a change to this braking step will be made in any case is therefore already known, and at the same time the sustained-action brake actual braking effect variable that will be generated by the sustained-action brake in that braking step is already known.

The control module that controls the sustained-action brake, for example an assistance control module, which is designed to automatically brake the commercial vehicle depending on predetermined parameters, for example in the context of an adaptive speed control (ACC), an electronic stability program (ESP) or cruise control (CC), can thus at least partially learn the characteristics of the sustained-action brake and take the same into account when generating a braking requirement setpoint in order to optimize the deceleration effect of the commercial vehicle in the respective situation without having to resort to brakes that are susceptible to wear. In particular, lorries (trucks) or buses come into consideration as commercial vehicles.

If the learning process is repeated several times or if multiple braking requirement setpoints are specified in one learning process and implemented by the sustained-action brake, correspondingly several braking action variable coefficients and correspondingly several braking steps can be identified in order to detect and assign all braking steps of the sustained-action brake after a certain period of time or a certain number of differently identified braking action variable coefficients. The time taken until all braking steps and braking action variable coefficients are identified depends on how often and with how many different braking requirement setpoints the sustained-action brake is controlled by the control module while driving.

In a particularly effective way, therefore, the learning process takes place when braking requirement setpoints, for example in the form of continuously running ramps, take the form of a minimum sustained-action brake braking torque of the sustained-action brake, which is generated in a passive operating mode of the sustained-action brake, and a reference braking torque is requested that characterizes the maximum possible sustained-action brake braking torque—at maximum engine revolution rate—or the maximum possible braking effect variable. According to this, the braking requirement setpoint passes through the entire possible spectrum of the sustained-action brake and all possible braking steps as well as the corresponding braking step threshold values can be identified, assigned and stored accordingly.

Since in normal driving mode such a learning process with continuously running ramps would lead to unintended and possibly uncontrolled braking and is therefore unworkable, such an approach may be provided, for example, at the end of the production line (EOL) at the manufacturer. This can advantageously ensure that any configuration of the sustained-action brake that can be provided by the manufacturer is supported without separate parameterization or software adjustment, while at the same time being able to be learned in a simple manner. In driving mode, on the other hand, it is advantageous if discrete and discontinuous values for the braking requirement setpoints are specified, for example by the assistance control module in the context of a deceleration that is already to be performed, on the basis of which the learning will be carried out.

As braking step threshold values, braking step activation threshold values and braking step deactivation threshold values are preferably different in a braking step. The braking step activation threshold value indicates the values of the braking requirement setpoint at which the respective braking step is activated if the vehicle actual deceleration is increased as a result of the control of the sustained-action brake with this braking requirement setpoint. The braking step deactivation threshold, on the other hand, indicates the values of the braking requirement setpoint at which the respective braking step is deactivated and is therefore switched to a lower braking step if the vehicle actual deceleration is reduced as a result of the control of the sustained-action brake with this braking requirement setpoint.

Thus, braking step threshold values are specified and learned both for an increase in the deceleration effect and for a reduction of the deceleration effect by appropriately controlling the sustained-action brake. This takes into account the switch-on and switch-off hysteresis of the sustained-action brakes. This prevents the sustained-action brake from being switched on and off at all or constantly switching from one to the other braking step when the braking requirement setpoint fluctuates exactly around the respective braking step threshold value. This can be avoided by defining separate braking step threshold values for switching the sustained-action brake on and off. For this purpose, the hysteresis is implemented such that the braking step deactivation threshold value of a braking step is lower than the braking step activation threshold value of the same braking step (see also FIG. 2a).

Preferably, storing the braking requirement setpoint as the braking step activation threshold value of a certain braking step only takes place if a value is not already stored for the braking step activation threshold value for this braking step that is smaller than the braking requirement setpoint or for which an earlier activation of the respective braking step is already carried out in the event of an increase in the actual vehicle deceleration as a result of control of the sustained-action brake.

This advantageously recognizes that only the value that activates the respective braking step effectively at the earliest point is to be stored as a braking step activation threshold value. All other braking requirement setpoints, which are determined and stored for a certain braking step in the learning process, can be deleted or disregarded and storage of these values can be omitted.

The same applies to storing the braking requirement setpoint as the braking step deactivation threshold value of a particular braking step that only takes place if a braking step deactivation threshold value for that braking step does not already have a value that is smaller than the braking requirement setpoint or for which the same braking step is subsequently deactivated in the event of a reduction in the actual vehicle deceleration as a result of control of the sustained-action brake.

Preferably, the braking effect variable coefficient of a respective braking step can also be stored in order to also advantageously be able to access the ratio between the sustained-action brake actual braking effect variable and the maximum sustained-action brake braking effect variable of a braking step when determining and outputting the braking requirement setpoint.

FIG. 1 shows a schematic view of a commercial vehicle 100, for example a bus or a truck with a braking system 1, which comprises service brakes 2 and two types of sustained-action brakes 3, 4. According to this, an engine exhaust brake or exhaust flap brake 3 (exhaust retarder) is provided as a first variant of the sustained-action brake, which can selectively open and close an exhaust pipe 3b of the commercial vehicle 100 by means of a butterfly valve 3a. Furthermore, a decompression brake 4 (engine retarder) is provided as a further embodiment, which can achieve targeted air supply to the cylinders of an engine 5 in the commercial vehicle 100 to bring about engine braking. For the sake of completeness, both types of sustained-action brakes 3, 4 are drawn in FIG. 1. However, only one of the two versions may be provided in the commercial vehicle 100.

Both sustained-action brakes 3, 4 are able to gradually reduce an engine revolution rate of the engine 5 by the specified measures, i.e. by adjusting the butterfly valve 3a or by a targeted air supply to the engine cylinder at the appropriate moment, thereby providing engine braking with a correspondingly graduated braking effect variable, which is specified, for example, as a sustained-action brake braking torque D or a subsequent sustained-action brake braking force F. As a result of the engine braking, the driven wheels 6 of the commercial vehicle 1 can then ensure a corresponding braking of the commercial vehicle 1, after which a certain vehicle actual deceleration zIst is set.

For the operation of the braking system 1, on the one hand a service brake control module 10 is provided, which, as a result of any braking requirement, operates the service brakes 2 pneumatically or electrically in a controlled manner in order to control the commercial vehicle 100 deceleration accordingly. A sustained-action brake control module 20 outputs a control signal S1 according to an existing braking requirement to the respective available sustained-action brake 3, 4 in order to produce a certain sustained-action brake braking torque D or a sustained-action brake braking force F in steps depending on the control signal with the measures described above and to decelerate the commercial vehicle 100 during engine braking. The sustained-action brake control module 20 can also be integrated within the service brake control module 10.

The adjustment of the sustained-action brake braking torque D by the respective sustained-action brake 3, 4 is carried out, according to the invention, by a number A of braking steps BS.i; with i=1, . . . , A, in which a different discrete sustained-action brake braking torque D is generated in each case. It is therefore not possible that the respective sustained-action brake 3, 4 generates values of the sustained-action brake braking torque D continuously between a minimum sustained-action brake braking torque DMin, which is present in a passive operating mode of the sustained-action brake 3, 4 and can also be specified as a minimum sustained-action braking force FMin, and a maximum sustained-action brake braking torque DMax, which indicates a maximum possible braking effect of the sustained-action brake 3, 4 when the sustained-action brake 3, 4 is activated.

Figure 2A:
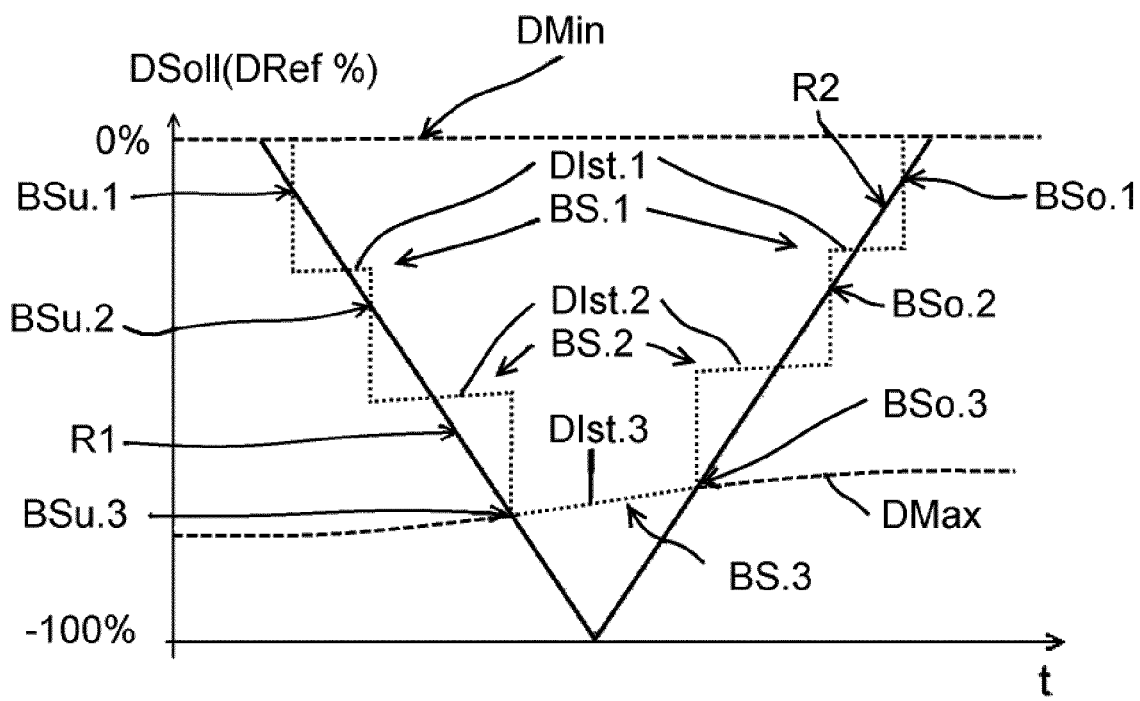
FIGS. 2*a*, 2*b* show examples of braking requirements for a learning process and a reaction of the sustained-action brake to those braking requirements.

This is shown in FIG. 2a by way of example. Accordingly, it is provided to control the sustained-action brake 3, 4 with a braking requirement, for example in the form of a predetermined sustained-action brake setpoint braking torque DSoll. The braking requirement is specified in the representation in FIG. 2a as a percentage braking torque, wherein with 0% as the sustained-action braking-setpoint braking torque DSoll the minimum sustained-action brake braking torque DMin is generated, i.e. a minimum deceleration effect, and with 100% as the sustained-action braking-setpoint braking torque DSoll a reference sustained-action brake braking torque DRef of the sustained-action brake 3, 4, i.e. a maximum deceleration effect of the sustained-action brake 3, 4, which can also be specified as a reference sustained-action brake braking force FRef, is generated.

The reference sustained-action brake braking torque DRef is a parameter of the respective sustained-action brake 3, 4 and indicates the maximum capability of the sustained-action brake 3, 4. If the sustained-action brake 3, 4 is activated at the maximum revolution rate of the engine 5, the reference sustained-action brake braking torque DRef at the time of activation of the sustained-action brake 3, 4 corresponds to the maximum sustained-action brake braking torque DMax. However, since the engine revolution rate decreases as a result of the motor braking initiated via the sustained-action brake 3, 4, the maximum sustained-action brake braking torque DMax of the sustained-action brake 3, 4 changes, while the reference sustained-action brake braking torque DRef always remains the same. Therefore, the braking requirement is always given as a percentage of the reference sustained-action brake braking torque DRef.

This is shown in FIG. 2a by way of example, according to which the engine 5 does not run at full engine revolution rate at the beginning of braking, so that at the time of activation the sustained-action brake 3, 4 can generate only about 80% of the maximum possible reference sustained-action brake braking torque DRef, i.e. the maximum sustained-action brake braking torque DMax at this time corresponds to approx. 0.8 times the reference sustained-action brake braking torque DRef.

The braking requirement in FIG. 2a varies against time t first along a continuously descending ramp R1 between 0% and −100%, with which a continuous increase of the vehicle actual deceleration zIst is requested against time t, i.e. a stronger deceleration, and then along a continuously increasing ramp R2 between −100% and 0%, with which a continuous reduction of the vehicle actual deceleration zIst is requested against time t, i.e. a gentler deceleration.

The reaction of the sustained-action brake 3, 4 to this braking requirement is indicated in FIG. 2a by means of sustained-action brake actual braking torques DIst.i generated by the sustained-action brake 3, 4; with i=1, . . . , A. Since the sustained-action brake 3, 4 is operated in braking steps BS.i, the sustained-action brake 3, 4 only produces discrete sustained-action brake actual braking torques DIst.i in the respective driving situation, each of which is assigned to a braking step. BS.i. In FIG. 2a, for example, a number A of braking steps of three is provided, i.e. three braking steps BS.i; with i=1, 2, 3; are provided between the minimum sustained-action brake braking torque DMin and the maximum sustained-action brake braking torque DMax during operation of the sustained-action brake 3, 4. However, more or fewer than three braking steps BS.i can be provided.

According to this embodiment, the sustained-action brake actual braking torque DIst.i assigned to the respective braking step BS.i is distributed at equal intervals between the minimum sustained-action brake braking torque DMin and the currently available maximum sustained-action brake braking torque DMax. This means that in a first braking step BS.1, a first sustained-action brake actual braking torque DIst.1 is generated by one third of the maximum sustained-action brake braking torque DMax. Correspondingly, in a second braking step BS.2 two thirds of the maximum sustained-action brake braking torque DMax is generated and in a third braking step BS.3 the maximum sustained-action brake braking torque DMax is generated.

Since, as already described, the maximum sustained-action brake braking torque DMax depends on the current engine revolution rate, which decreases as a result of the engine braking, due to their dependence the sustained-action brake actual braking torques DIst.i in the individual braking steps BS.i also decrease slightly with increasing time t.

For activating the respective braking step BS.i and thus for controlling or generating the corresponding sustained-action brake actual braking torque DIst.i, braking step activation threshold values BSu.i and braking step deactivation threshold values BSo.i are provided, which are uniquely assigned to each braking step BS.i. The respective braking step activation threshold value BSu.i of a braking step BS.i indicates when switching to the respective braking step BS.i occurs if the deceleration effect of the sustained-action brake 3, 4 is increased, i.e. in FIG. 2a in the course of the descending ramp R1. The braking step deactivation threshold value BSu.i of a braking step BS.i, on the other hand, indicates when the respective braking step BS.i is deactivated and a correspondingly lower braking step BS.i is activated if the deceleration effect of the sustained-action brake 3, 4 reduces, i.e. in FIG. 2a in the course of the ascending ramp R2.

Thus, when the descending ramp R1 is driven down and when a braking requirement is reached that corresponds to a first braking step activation threshold value BSu.1 of approx. 10% of the reference sustained-action brake braking torque DRef, switchover occurs from a passive operating mode in the first braking step BS.1, i.e. a first sustained-action brake actual braking torque DIst.1 is generated by the sustained-action brake 3, 4 that corresponds to 33% of the maximum sustained-action brake braking torque DMax. Until a sustained-action brake setpoint braking torque DSoll is requested via the descending ramp R1 that corresponds to said first sustained-action brake actual braking torque DIst.1, the commercial vehicle 100 is over-braked. If this value is reached and exceeded by a requested sustained-action braking-setpoint braking torque DSoll, the commercial vehicle 100 is under-braked for the following course of the descending ramp R1 until switchover to the second braking step BS.2 occurs. This is carried out as soon as a second braking step activation threshold value BSu.2 of approx. 33% of the reference sustained-action brake braking torque DRef is reached via the descending ramp R1. From this time t, the sustained-action brake 3, 4 generates a second sustained-action brake actual braking torque DIst.2 of 66% of the maximum sustained-action brake braking torque DMax and the commercial vehicle 100 is therefore initially over-braked again until the sustained-action brake setpoint braking torque DSoll on the descending ramp R1 has fallen to the same value. Switchover to the third braking step BS.3 occurs accordingly at a third braking step activation threshold value BSu.3 of approx. 75% of the reference sustained-action brake braking torque DRef, in which step the maximum sustained-action brake braking torque DIst.3 is generated as the third sustained-action brake actual braking torque DMax for the currently prevailing engine revolution rate.

For the ascending ramp R2 when a reduction occurs in the deceleration effect, the braking step deactivation threshold value BSo.i is relevant, which indicates when the corresponding braking step BS.i, which is currently activated, is deactivated and switching to a lower braking step BS.i occurs. Therefore, if the rising ramp R2 assumes a third braking step deactivation threshold value BSo.3 of approx. 70% of the reference sustained-action brake braking torque DRef, the third braking step BS.3, which is currently activated, is deactivated and the second braking step BS.2 is activated instead, in which the second sustained-action brake actual braking torque DIst.2 of 66% of the maximum sustained-action brake braking torque DMax is again generated. At a second braking step deactivation threshold value BSo.2 of approx. 30% of the reference sustained-action brake braking torque DRef, the second braking step BS.2 is deactivated accordingly and switched to the first braking step BS.1. At a first braking step deactivation threshold value BSo.1 of 8% of the reference sustained-action brake braking torque DRef, switchover to the passive operating mode of the sustained-action brake 3, 4 occurs.

Thus, a positive association between the continuously running braking requirement and the discrete braking steps BS.i can be made by means of said values with knowledge of the reference sustained-action brake braking torque DRef. In order to achieve a corresponding deceleration effect by the sustained-action brake 3, 4, said values are to be determined or learned by the corresponding deceleration requesting device, which will be discussed in more detail later.

The continuously running braking requirement for the sustained-action brake control module 20 can be specified independently of the type of the controlled sustained-action brake 3, 4 by an assistance control module 30, which is embodied to automatically decelerate the commercial vehicle 100 depending on specified standard parameters, for example in the context of adaptive cruise control (ACC), electronic stability program (ESP) or cruise control (CC).

For this purpose, by means of a sustained-action brake signal S2 the assistance control module 30 provides a braking requirement setpoint zSoll, DSoll, FSoll that characterizes the deceleration in the corresponding situation in which the commercial vehicle 100 is to be braked by the respective sustained-action brake 3, 4, which deceleration is to be implemented by controlling the respective sustained-action brake 3, 4. The braking requirement setpoint can be given here, for example, by a setpoint vehicle deceleration zSoll, the sustained-action brake setpoint braking torque DSoll, a resulting sustained-action brake setpoint braking force FSoll or any other related setpoint.

According to this version, the respective braking requirement setpoint zSoll, DSoll, FSoll is transmitted via the sustained-action brake signal S2 from the assistance control module 30 directly to the sustained-action brake control module 20. Alternatively, the sustained-action brake signal S2 can also be passed from the service brake control module 10 to the possibly integrated sustained-action brake control module 20, if, for example, preprocessing and distribution are to take place of an automatically specified braking requirement of the assistance control module 30 to the service brakes 2 and the sustained-action brakes 3, 4.

A learning process is provided in order for an optimal sustained-action brake actual braking torque DIst.i to be set up for the respective braking situation by the sustained-action brake 3, 4 controlled by the assistance control module 30 depending on the sustained-action brake signal S2 or the respective braking requirement setpoint zSoll, DSoll, FSoll. In this learning process, the assistance control module 30 determines when a corresponding activation or deactivation of the braking steps BS.i takes place. This is necessary because the assistance control module 30 does not normally know the exact parameters of the individual braking steps BS.i, i.e. in particular the number A of braking steps as well as the braking step threshold values BSu.i, BSo.i. Therefore, taking into account the over-braking phases and under-braking phases in a BS.i braking step in the corresponding situation, in which braking of the commercial vehicle 100 is to be carried out by the respective sustained-action brake 3,4, it is not possible to reliably decide from when switchover to the corresponding braking step BS.i could or should be carried out.

Figure 3:
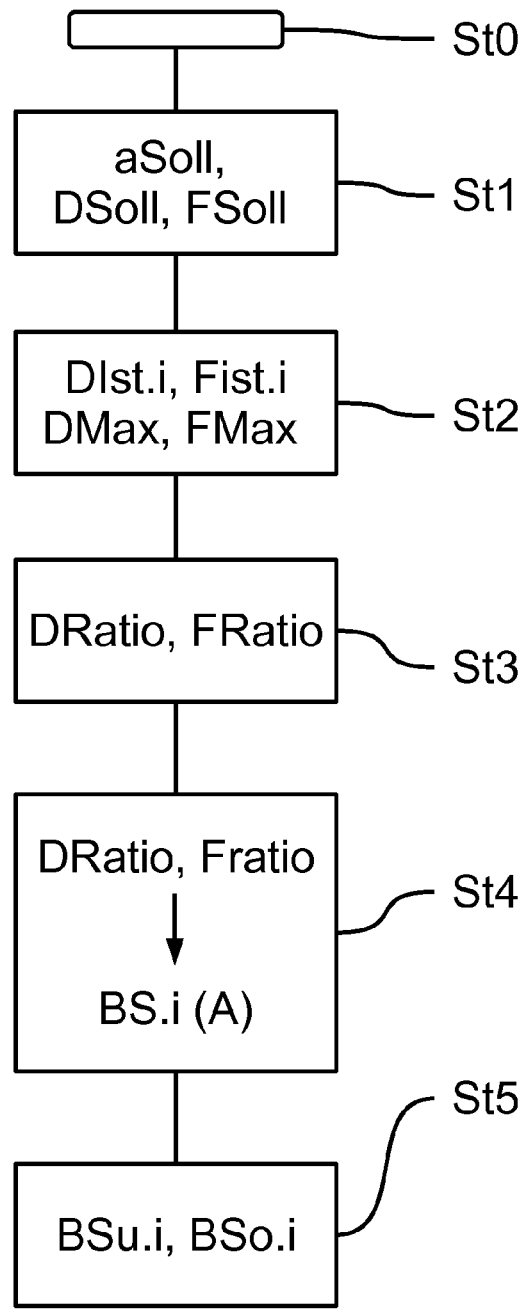
FIG. 3 shows a flowchart of a method according to an embodiment of the invention.

For the learning process, according to FIG. 3 after the initialization of the assistance control module 30 in an initial step St0 it is initially provided in a first step St' to determine the currently available braking requirement setpoint zSoll, DSoll, FSoll specified by the assistance control module 30. This braking requirement setpoint zSoll, DSoll, FSoll is then transmitted by means of the sustained-action brake brake signal S2 to the sustained-action brake control module 20 in order to achieve a certain deceleration effect with the sustained-action brake 3, 4. Since the assistance control module 30 does not yet have knowledge of the number A of braking steps and the braking step threshold values BSu.i, BSo.i at this time, it is not immediately known how strongly the commercial vehicle 100 will react to the braking requirement setpoint zSoll, DSoll, FSoll.

In a second step St2, it is then provided to determine a current sustained-action brake actual braking effect variable DIst.i, FIst.i, which indicates the braking effect variable D, F of the sustained-action brake 3, 4 that is to be generated as a result of the control of the sustained-action brake 3, 4 with the brake request setpoint zSoll, DSoll, FSoll. The sustained-action brake actual braking effect variable can be the sustained-action brake actual braking torque DIst.i or also a sustained-action brake actual braking force FIst.i, which thus indicates the braking torque D or the associated braking force F that is currently being generated as the characteristic braking effect variable. As already described above, it is to be expected that the sustained-action brake actual braking effect variable DIst.i, FIst.i assumes only discrete values depending on the number A of braking steps.

In order to determine which braking step BS.i the determined sustained-action brake actual braking effect variable Dist.i, FIst.i is assigned to, a currently available maximum sustained-action brake braking effect variable is still recorded, i.e. the maximum sustained-action brake braking torque DMax or a maximum sustained-action brake braking force FMax, which, as described above, indicates the maximum braking effect variable D, F that can be achieved taking into account the current engine revolution rate.

The sustained-action brake actual braking effect variable DIst.i, FIst.i as well as the maximum sustained-action brake braking effect variable DMax, FMax are provided by the sustained-action brake control module 20 itself, so that they can easily be used as part of the learning process.

From the respective sustained-action brake actual braking effect variable DIst.i, FIst.i and the maximum sustained-action brake braking effect variable DMax, Fmax, in a third step St3 a braking effect variable coefficient, i.e. a braking torque coefficient DRatio or a braking force coefficient FRatio is determined, which characterizes a difference or a ratio between the respective sustained-action brake actual braking effect variable Dist.i, FIst.i and the maximum sustained-action brake braking effect variable DMax, FMax.

In a fourth step St4, the determined braking effect variable coefficient DRatio, FRatio is then assigned to a braking step BS.i of the sustained-action brake 3, 4 so that each braking step BS.i is assigned only one braking effect variable coefficient DRatio, FRatio.

If, therefore, nothing is known at the beginning of the learning process and, as a result of a braking requirement a sustained-action brake actual braking torque DIst.i and a maximum sustained-action brake braking torque DMax are determined, which result in a braking torque coefficient DRatio of DRatio=DIst.i/DMax=2/3, then this value "2/3" is initially assigned to a certain braking step BS.i that is not yet assigned such a braking torque ratio DRatio of "2/3". If this is the first determined braking torque coefficient DRatio, then it follows from the learning process that there is only one braking step BS.i, since no further information is available. In addition, it is clear from this assignment that a sustained-action brake actual braking torque DIst.i of 2/3 of the maximum sustained-action brake braking torque DMax is generated in this braking step BS.i.

If in a previous learning process a braking torque coefficient DRatio of, for example, "1/3" has been determined and assigned to a certain braking step BS.i, the braking torque coefficient DRatio of "2/3" following from this learning process is assigned to another braking step BS.i and from the learning process it follows that there are at least two braking steps BS.i.

This means that by repeatedly determining the respective braking effect variable coefficient DRatio, FRatio it is possible to determine how many braking steps BS.i there are, since a number NK of different braking action variable coefficients DRatio, FRatio gives the number A of braking steps, which is possible in a particularly effective manner if the braking requirement is as indicated in FIG. 2a, specified with a descending and/or ascending ramp R1, R2 and the braking effect variable coefficient DRatio, FRatio is determined in short intervals. In this way, it can also be determined what proportion of the maximum sustained-action brake braking torque DMax is generated in the respective braking step BS.i. Since such a learning process with continuous ramps R1, R2 according to FIG. 2a would lead to unintended and possibly uncontrolled braking in normal driving mode and is therefore not feasible, such an approach may be provided for, for example, at the end of the manufacturer's line (EOL).

Figure 2B:
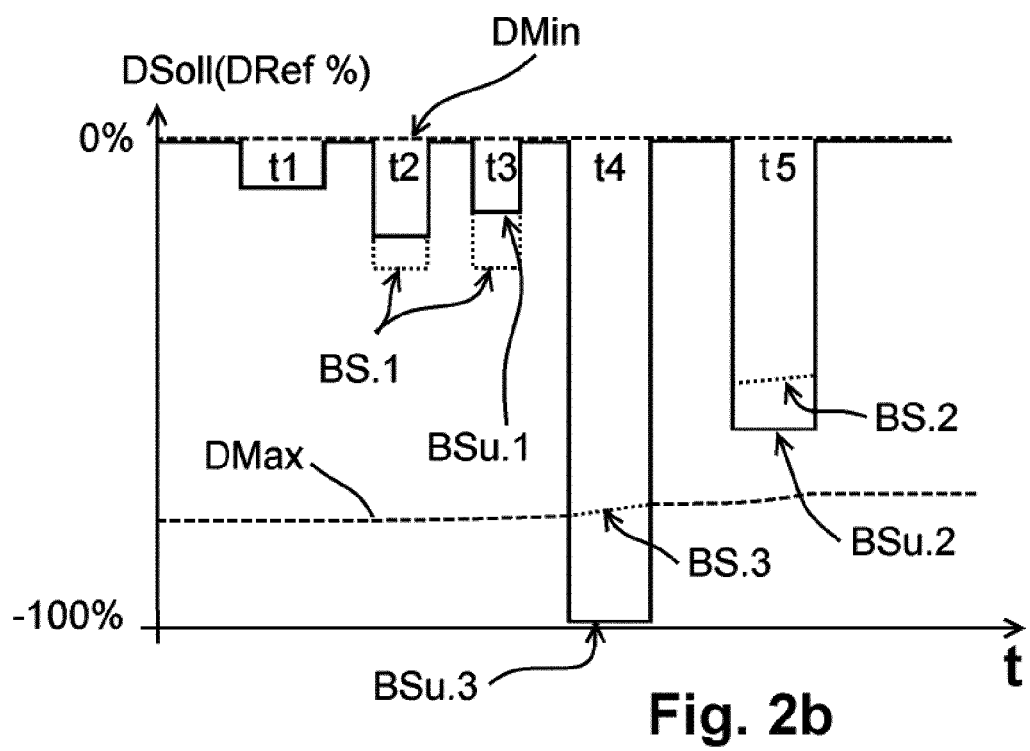

In ongoing driving, by contrast, discrete values for the braking requirement setpoints zSoll, DSoll, FSoll are only temporarily specified by the assistance control module 30, so that the time until all braking steps BS.i as well as brake action variable coefficients DRatio, FRatio are identified depends on how often and with how many different braking requirement setpoints zSoll, DSoll, FSoll the respective sustained-action brake 3, 4 is controlled by the assistance control module 30 while traveling. This is exemplified in FIG. 2b for an alternative learning process. According to this, at the first time t1 there is a braking requirement setpoint zSoll, DSoll, FSoll, which corresponds to approx. −10% of the reference sustained-action brake braking torque DRef Since the as yet unknown first braking step activation threshold value BSu.1 has not yet been exceeded by this braking requirement setpoint zSoll, DSoll, FSoll, which is determined by the fact that there is no change in the sustained-action brake actual braking effect variable DIst.i, FIst.i, nothing can be assigned to this braking requirement setpoint zSoll, DSoll, FSoll.

At a second time t2, a braking requirement setpoint zSoll, DSoll, FSoll is set, which corresponds to −20% of the reference sustained-action brake braking torque DRef. With this braking requirement setpoint zSoll, DSoll, FSoll, the first braking step activation threshold value BSu.1 is exceeded, which is determined by the fact that the sustained-action brake actual braking effect variable DIst.i, FIst.i responds with approx. −24% or there is a braking torque coefficient DRatio of "1/3", for example. For the time being −20% DRef is stored as the first braking step activation threshold value BSu.1. At a third time t3, a braking requirement setpoint zSoll, DSoll, FSoll is set, which corresponds to −15% of the reference sustained-action brake braking torque DRef With this braking requirement setpoint zSoll, DSoll, FSoll, the first braking step activation threshold value BSu.1 is also exceeded, which is determined by the fact that the sustained-action brake actual braking effect variable DIst.i, FIst.i responds with less than −24% or there is also a braking torque coefficient DRatio of "1/3". This means that with this braking event, the braking requirement setpoint zSoll, DSoll, FSoll of −15% of the reference sustained-action brake braking torque DRef is closer to the first braking step activation threshold BSu.1, so that this value is stored as the new first braking step activation threshold value BSu.1 for the first braking step BS.1.

The same applies to the fourth time t4, at which for −100% of the reference sustained-action brake braking torque DRef, a further braking step BS.i or another braking step activation threshold BSu.i is learned, for which a braking torque coefficient DRatio of, for example, "3/3" is detected. At this time, the actual number A of braking steps BS.i is still unknown, so that this −100% of the reference sustained-action brake braking torque DRef is assigned to a second braking step BS.2 for the time being. At a fifth time t5, for −60% of the reference sustained-action brake braking torque DRef, a further braking step BS.i or another braking step activation threshold BSu.i is learned, for which a braking torque coefficient DRatio of, for example, "2/3" is determined. From this it can be concluded that there are three braking steps BS.i, wherein −60% of the reference sustained-action brake braking torque DRef is assigned to the second braking step BS.2 as the second braking step activation threshold value BSu.2 and −100% of the reference sustained-action brake braking torque DRef set at the fourth time t4 is assigned to the third braking step BS.3 as the third braking step activation threshold value BSu.3. Thus, sorting of the braking steps BS.i is carried out.

In order to additionally determine the braking step threshold values BSu.i, BSo.i for these braking steps BS.i, in a fifth step St5 it is provided to store the braking requirement setpoint zSoll, DSoll, FSoll, which results in the braking effect variable DRatio, FRatio of the respective associated braking step BS.i. The braking requirement setpoint zSoll, DSoll, FSoll is stored as the braking step activation threshold BSu.i if an increase of the deceleration effect is requested via the brake request setpoint zSoll, DSoll, FSoll, for example according to the decreasing ramp R1 in FIG. 2a, and is stored as a braking step deactivation threshold BSo.i if a reduction of the deceleration request is requested, for example according to the increasing ramp R2 in FIG. 2a.

Preferably, such storage of the braking requirement setpoint zSoll, DSoll, FSoll as the braking step threshold value BSu.i, BSo.i for the currently relevant braking step BS.i is only carried out if a value for the braking step threshold BSu.i, BSo.i for this braking step BS.i has not already been saved at a previous time in such a learning process that is closer to the actual braking step threshold BSu.i, BSo.i and therefore provides for activation or deactivation earlier. Thus, when performing several learning operations, the stored value approaches the actual value of the respective braking step threshold Value BSu.i, BSo.i more and more.

Thus, in several steps, which are preferably carried out on the assistance control module 30, both the number A of braking steps as well as the values of the braking step threshold values BSu.i, BSo.i of the respective braking steps BS.i can be determined and stored. With these values, the assistance control module 30 can then be used to optimize control of the respective sustained-action brake 3, 4 by switching earlier to the next higher braking step BS.i, for example, in order with knowledge of the sustained-action brake actual braking effect variable DIst.i, FIst.i in the respective braking step BS.i, to take advantage of over-braking phases and under-braking phases in an appropriate manner, instead of resorting to the additional control of wear-susceptible service brakes 2.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Braking system
2 Service brakes
3 Engine exhaust brake/exhaust flap brake
3a Butterfly valve
3b Exhaust pipe
4 Decompression brake
5 Engine
6 Driven wheels
10 Service brake control module
20 Sustained-action brake control module
30 Assistance control module
100 Commercial vehicle
A Number of braking steps
BS.i Braking steps
BSo.i Braking step activation threshold value
BSu.i Braking step deactivation threshold value
D Sustained-action brake braking torque
DIst.i Sustained-action brake actual braking torque
DMax Maximum sustained-action brake braking torque
DMin Minimum sustained-action brake braking torque
DRatio Braking torque coefficient
DRef Reference sustained-action brake braking torque
DSoll Sustained-action brake setpoint braking torque
F Braking force
FIst.i Sustained-action brake actual braking force
FMax Maximum sustained-action brake braking force
FMin Minimum sustained-action brake braking force
FSoll Sustained-action brake setpoint braking force
FRatio Braking force coefficient
FRef Reference sustained-action brake braking force
i Index
NK Number
R1 Descending ramp
R2 Ascending ramp S1 Control signal
S2 Sustained-action brake brake signal
t Time
t1 First time
t2 Second time
t3 Third time
t4 Fourth time
t5 Fifth time
zIst Vehicle actual deceleration
zSoll Vehicle setpoint deceleration
St1, St2, St3, St4, St5 Steps of the method

The invention claimed is:

1. A method for carrying out braking steps of a commercial vehicle to learn braking step threshold values of a sustained-action brake of the commercial vehicle, the method comprising:
detecting a braking requirement setpoint;
controlling the sustained-action brake with the braking requirement setpoint to increase or reduce an actual deceleration of the commercial vehicle, thereby generating a braking effect variable of the sustained-action brake;
detecting a sustained-action brake actual braking effect variable and a maximum sustained-action brake braking effect, wherein the sustained-action brake actual braking effect variable characterizes the braking effect variable generated by the sustained-action brake as a result of controlling the sustained-action brake with the braking requirement setpoint, and wherein the maximum sustained-action brake braking effect variable characterizes a maximum braking effect variable that can be produced by the sustained-action brake during controlling of the sustained-action brake with the braking requirement setpoint;
forming a braking effect variable coefficient that characterizes a ratio of the sustained-action brake actual braking effect variable and the maximum sustained-action brake braking effect variable that results from controlling of the sustained-action brake with the braking requirement setpoint;
assigning the braking effect variable coefficient to a braking step of the sustained-action brake such that each braking step is assigned only one braking effect variable; and
storing the braking requirement setpoint that results in the braking effect variable coefficient, as the braking step threshold value of the braking step to which the braking effect variable coefficient is assigned, wherein the braking step threshold value indicates the braking requirement setpoint at which the respective braking step is activated or deactivated.

2. The method as claimed in claim 1, wherein a braking step activation threshold value indicates from which values of the braking requirement setpoint the respective braking step is activated in the case of an increase in the vehicle actual deceleration as a result of control with this braking requirement setpoint, and a braking step deactivation threshold value indicates from which values of the braking requirement setpoint the respective braking step is deactivated in the case of a reduction of the vehicle actual deceleration as a result of control with this braking requirement setpoint.

3. The method as claimed in claim 2, wherein the braking step activation threshold value assigned to a braking step is not equal to the braking step deactivation threshold value that is assigned to the same braking step.

4. The method as claimed in claim 2, wherein storing the braking requirement setpoint as a braking step activation threshold value of a certain braking step takes place only if a braking step activation threshold is not already stored for this braking step that is smaller than the braking requirement setpoint, and/or for which the respective braking step has already been activated previously if the vehicle actual deceleration increases as a result of control of the sustained-action brake with this stored braking step activation threshold value.

5. The method according to claim 2, wherein storing the braking requirement setpoint as a braking step deactivation threshold value of a certain braking step takes place only if this braking step has not already been assigned a braking step deactivation threshold value which is smaller than the braking requirement setpoint and/or for which later deactivation of the same braking step is carried out in the event of a reduction in the actual vehicle deceleration due to control of the sustained-action brake with this stored braking step deactivation threshold value.

6. The method according to claim 2, wherein the activation of a higher braking step in which a higher sustained-action brake actual braking effect variable is generated is concluded if the braking effect variable coefficient increases as a result of control of the sustained-action brake with a certain braking requirement setpoint and that deactivation of the braking step and activation of a lower braking step in which a lower sustained-action brake actual braking effect variable is produced is concluded if the braking effect variable coefficient is reduced as a result of control of the sustained-action brake with a specific braking requirement setpoint.

7. The method according to claim 1, wherein at least one variable selected from the group consisting of a vehicle deceleration setpoint, a sustained-action brake setpoint braking torque and/or a sustained-action brake setpoint braking force is defined as a braking requirement setpoint.

8. The method according to claim 1, wherein a number of braking steps is learned depending on a number of different braking action variable coefficients assigned to the respective braking steps.

9. The method according to claim 1, wherein the braking effect variable coefficient of a respective braking step is also stored.

10. The method according to claim 1, wherein the sustained-action brake actual braking effect variable is caused by a sustained-action brake actual braking torque generated by the sustained-action brake in the respective braking step and the maximum sustained-action brake braking effect variable is caused by a maximum producible sustained-action brake braking torque during control of the sustained-action brake with the braking requirement setpoint, or
the sustained-action brake actual braking effect variable is caused by a sustained-action brake actual braking force generated by the sustained-action brake in the respective braking step and the maximum sustained-action brake braking effect variable is caused by a maximum producible sustained-action brake braking force generated with the sustained-action brake during control with the braking requirement setpoint.

11. The method according to claim 1, wherein each braking step is assigned an index, wherein the index is determined according to the braking effect variable coefficient in such a way that the braking steps are determined depending on the level of the sustained-action brake actual braking effect variable generated in the respective braking step.

12. The method according to claim 1, wherein the braking requirement setpoint is specified in the form of an ascending and/or descending ramp and forming a braking effect variable coefficient, assigning the braking effect variable coefficient to a braking step of the sustained-action brake and storing the braking requirement setpoint as the braking step threshold value of that braking step assigned to the braking effect variable coefficient are carried out for each of the braking requirement setpoints with which the sustained-action brake is controlled on the rising and/or descending ramp.

13. The method as claimed in claim 12, wherein the descending ramp runs between a minimum sustained-action brake braking effect variable and a reference braking effect variable of the sustained-action brake in the direction of an increase in the vehicle actual deceleration and the ascending ramp runs between the reference braking effect variable and the minimum sustained-action brake braking effect variable in the direction of a reduction in the vehicle actual deceleration, wherein the reference braking effect variable characterizes the maximum producible braking effect variable of the sustained-action brake regardless of the control of the sustained-action brake with the braking requirement setpoint.

14. The method according to claim 1, wherein the braking requirement setpoint is specified in discrete values and non-continuously.

15. A braking system for a commercial vehicle, the braking system comprising:
 a sustained-action brake, wherein the sustained-action brake is controllable with a braking setpoint for increasing or reducing a vehicle actual deceleration of the commercial vehicle by adjusting a braking effect variable of the sustained-action brake, and
 an assistance control module for specifying the braking requirement setpoint to the sustained-action brake, the assistance control module comprising a controller associated with one of an adaptive speed control system, an electronic stability program, or a cruise control system, wherein the assistance control module is configured to learn braking step threshold values of braking steps of the sustained-action brake by:
  controlling the sustained-action brake with the braking requirement setpoint to increase or reduce an actual deceleration of the commercial vehicle, thereby generating a braking effect variable of the sustained-action brake;
  detecting a sustained-action brake actual braking effect variable and a maximum sustained-action brake braking effect, wherein the sustained-action brake actual braking effect variable characterizes the braking effect variable generated by the sustained-action brake as a result of controlling the sustained-action brake with the braking requirement setpoint, and wherein the maximum sustained-action brake braking effect variable characterizes a maximum braking effect variable that can be produced by the sustained-action brake during controlling of the sustained-action brake with the braking requirement setpoint;
  forming a braking effect variable coefficient that characterizes a ratio of the sustained-action brake actual braking effect variable and the maximum sustained-action brake braking effect variable that results from controlling of the sustained-action brake with the braking requirement setpoint;
  assigning the braking effect variable coefficient to a braking step of the sustained-action brake such that each braking step is assigned only one braking effect variable; and
  storing the braking requirement setpoint that results in the braking effect variable coefficient, as the braking step threshold value of the braking step to which the braking effect variable coefficient is assigned, wherein the braking step threshold value indicates the braking requirement setpoint at which the respective braking step is activated or deactivated,
 wherein the assistance control module is configured, depending on the braking requirement, to determine and to output the braking requirement setpoint to the sustained-action brake.

16. The braking system as claimed in claim 15, wherein the sustained-action brake is embodied as an engine exhaust brake and/or as a decompression brake.

17. A vehicle, in particular a commercial vehicle, with a braking system, the breaking system comprising:
 a sustained-action brake, wherein the sustained-action brake is controllable with a braking setpoint for increasing or reducing a vehicle actual deceleration of the commercial vehicle by adjusting a braking effect variable of the sustained-action brake, and
 an assistance control module for specifying the braking requirement setpoint to the sustained-action brake, the assistance control module comprising a controller associated with one of an adaptive speed control system, an electronic stability program, or a cruise control system, wherein the assistance control module is configured to learn braking step threshold values of braking steps of the sustained-action brake by:
  controlling the sustained-action brake with the braking requirement setpoint to increase or reduce an actual deceleration of the commercial vehicle, thereby generating a braking effect variable of the sustained-action brake;
  detecting a sustained-action brake actual braking effect variable and a maximum sustained-action brake braking effect, wherein the sustained-action brake actual braking effect variable characterizes the braking effect variable generated by the sustained-action brake as a result of controlling the sustained-action brake with the braking requirement setpoint, and wherein the maximum sustained-action brake braking effect variable characterizes a maximum braking effect variable that can be produced by the sustained-action brake during controlling of the sustained-action brake with the braking requirement setpoint;
  forming a braking effect variable coefficient that characterizes a ratio of the sustained-action brake actual braking effect variable and the maximum sustained-action brake braking effect variable that results from controlling of the sustained-action brake with the braking requirement setpoint;
  assigning the braking effect variable coefficient to a braking step of the sustained-action brake such that each braking step is assigned only one braking effect variable; and
  storing the braking requirement setpoint that results in the braking effect variable coefficient, as the braking step threshold value of the braking step to which the braking effect variable coefficient is assigned, wherein the braking step threshold value indicates the braking requirement setpoint at which the respective braking step is activated or deactivated, wherein the assistance control module is configured, depending on the braking requirement, to determine and to output the braking requirement setpoint to the sustained-action brake.

* * * * *